Figure 1:
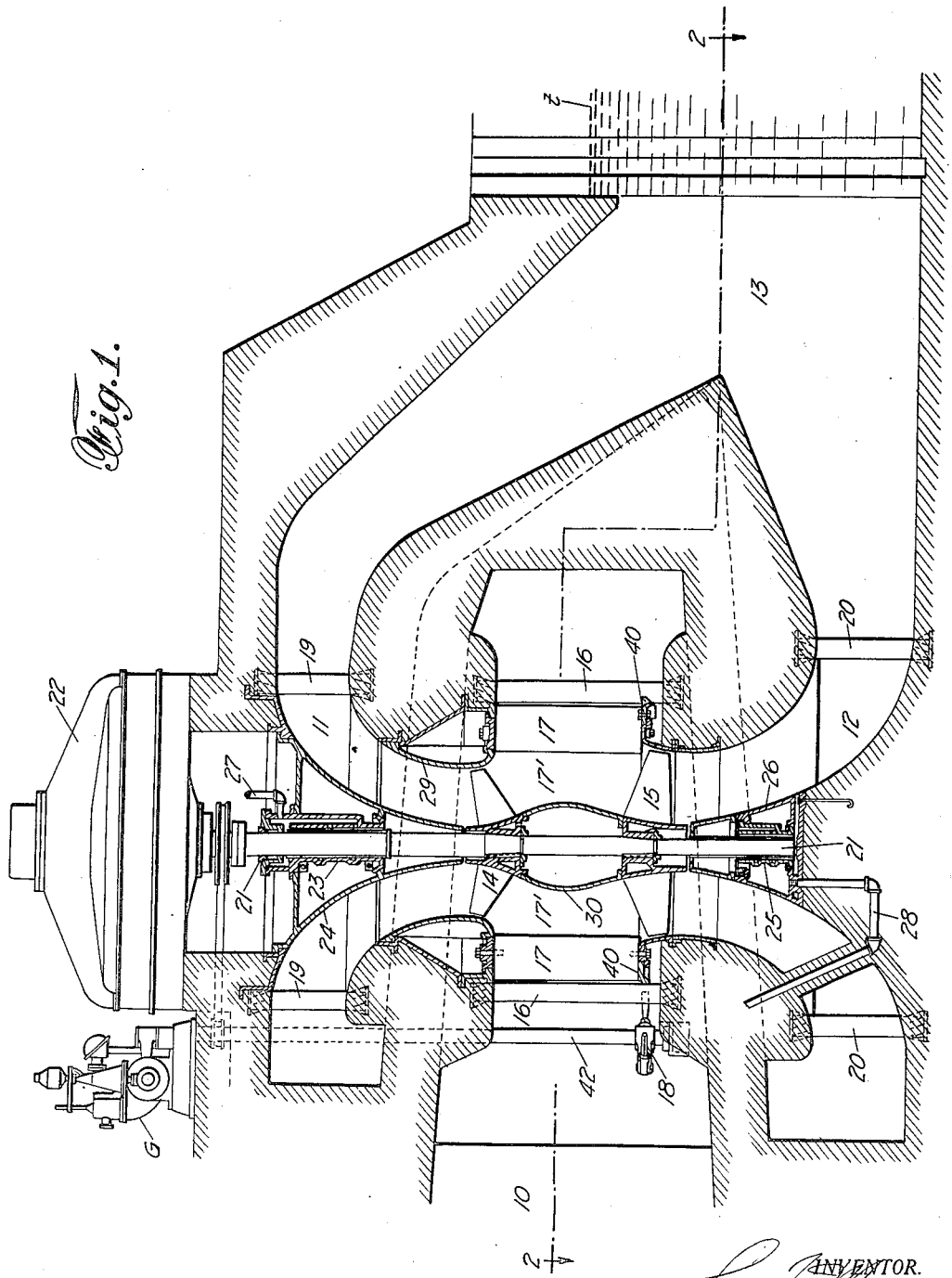

March 13, 1934.  L. F. MOODY  1,951,199
HYDRAULIC APPARATUS
Original Filed May 28, 1927  2 Sheets-Sheet 1

INVENTOR.
Lewis F. Moody
BY
Edward ......
ATTORNEY.

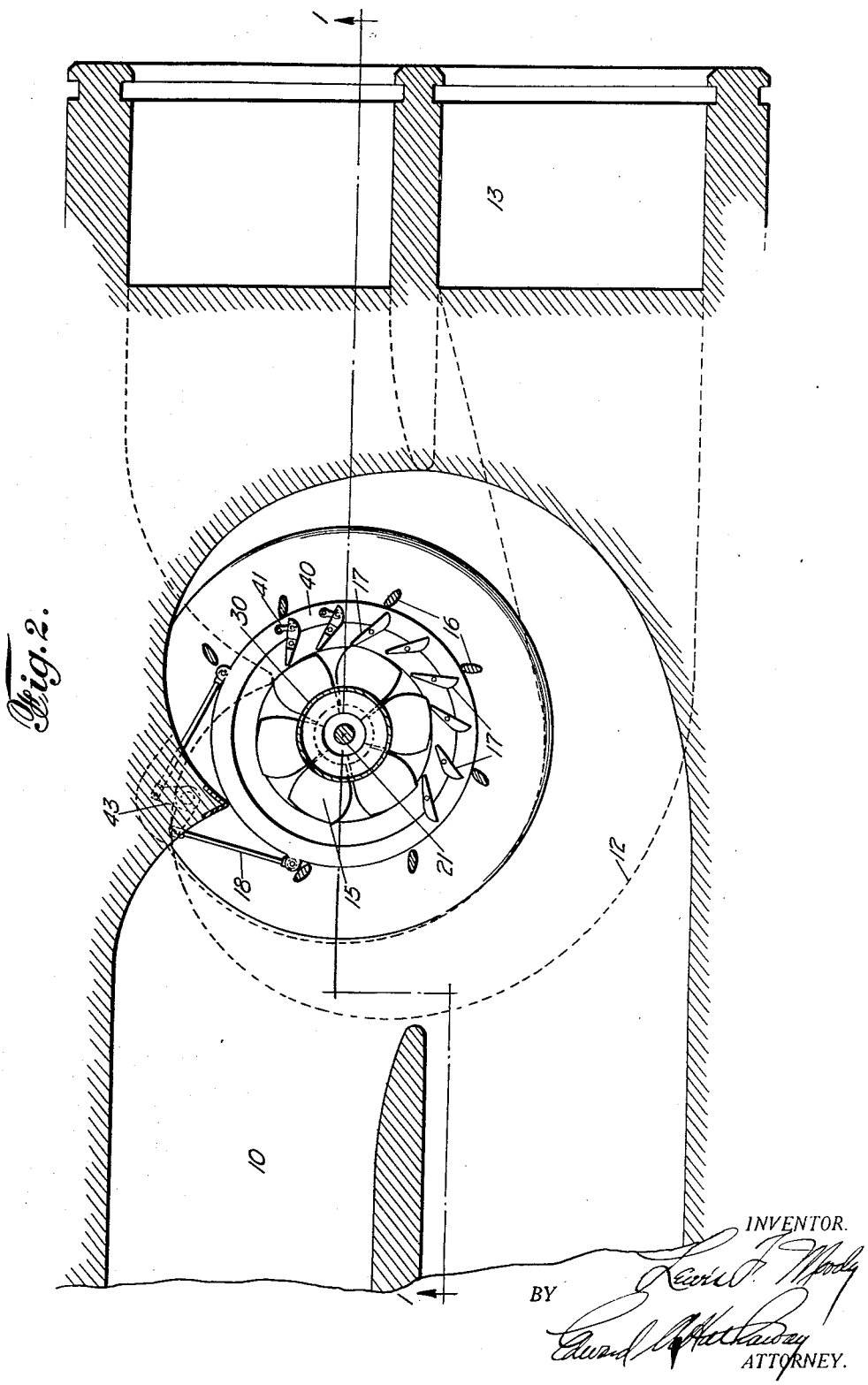

Patented Mar. 13, 1934

1,951,199

UNITED STATES PATENT OFFICE 1,951,199

HYDRAULIC APPARATUS

Lewis Ferry Moody, Philadelphia, Pa.

Original application May 28, 1927, Serial No. 195,105. Divided and this application August 2, 1930, Serial No. 472,548

18 Claims. (Cl. 253—149)

This invention relates to hydraulic turbines and particularly to those of the vertical shaft type.

In the effort to increase the speed of a turbine under a given head, so as to permit a reduction in the size of the generator driven by the turbine as well as the size of the turbine itself and the accompanying power house structure, runners having extremely high values of specific speed have been developed, but these necessarily require the location of the runner at a low point with respect to tail water. As hereinafter explained in detail, the higher the specific speed the lower the runner must be placed with respect to tail-water, and conversely the higher the runner is placed with respect to tail water, the lower will be its permissible specific speed. With the high specific speed runner located at the required low point there is, in many plants, available space above the runner for the location of a second runner connected with the same shaft which if it could be added to the unit would materially increase the power output and consequently the total specific speed of the entire unit.

The object of my invention is to provide a turbine in which this space above the lower runner contains an auxiliary upper runner mounted on the same shaft with the lower runner and so combined therewith that the lower runner may have a high specific speed while at the same time the auxiliary upper runner is adapted to operate at a lower specific speed suitable for its higher elevation above tailwater. The fact that runners of different specific speed are adapted to operate normally at the same actual speed permits the two runners to be mounted on the same shaft. In this way the high specific speed of the lower runner is maintained, and at the same time additional power is efficiently generated and delivered to the shaft by the lower specific speed upper runner, thus increasing the specific speed of the turbine unit as a whole.

The double runner turbines of the prior art are unable to operate most efficiently because there is mounted on the same shaft at least two substantially identical runners, which are therefore suited only for the same elevation and specific speed. For reasons which will be apparent hereinafter these prior runners are designed for the lower specific speed conditions under which the upper runner operates, thus eliminating cavitation of the upper runner and permitting it to operate efficiently although this is done at the expense of limiting the output of the lower runner. The total specific speed of the prior units will, therefore, be the resultant of two identical runners each having a specific speed limited to suit the elevation of the upper runner. If the runners were identically designed to have a high specific speed in accordance with the elevation of the lower runner and thereby cause the lower runner to operate efficiently, then the runner would necessarily be unfit for operation at the elevation of the upper one due to cavitation and inefficiency of operation. Hence it is seen that if both runners are designed for the conditions of the lowermost runner the upper runner is subjected to prohibitive conditions while if both runners are designed for the conditions of the uppermost runner then the lower runner is subjected to unnecessary limitation of its power. Thus, these prior double runners have not combined in a single unit the feature of the highest possible specific speed along with proper operation of both runners as is made possible with my present invention.

I here present the principle that these disadvantages can be obviated, and that in a single turbine unit an upper runner may be used to increase the power, or for the same total power the actual speed of the unit may be increased, by applying runners of different form and capacity so that the upper runner will be of relatively less power and less specific speed and the lower runner of relatively greater power and greater specific speed, but both will be keyed to the same shaft and will run at the same actual speed.

Further objects of my invention in the form and cooperation of the turbine parts will appear from the following description taken in connection with the accompanying drawings, in which Fig. 1 is a vertical sectional elevation of a turbine unit embodying the invention, taken on line 1—1 of Fig. 2;

Fig. 2 is a horizontal view on line 2—2 of Fig. 1.

In the embodiment of the invention shown in Figs. 1 and 2 the flow from headwater enters the turbine through intake 10 in spiral form, passing the water with a whirl through fixed stay vanes 16 and adjustable guide vanes 17 to the transition space 17' between the upper runner 14 and the lower runner 15. The flow is guided into the two runners by the double conical distance piece or sleeve 30 and is discharged, usually with a whirl, upward into the draft tube 11 and downward into the draft tube 12, both of these tubes being of the annular spreading type adapted to convert the velocity head of both the meridian and tangential velocity components into pressure head. The draft tubes 11, 12, discharge through outlet passages 13 into tail water having its level indicated at $t$.

The runners 14, 15 are of the high specific speed propeller type, the upper runner 14 being smaller in diameter and of less power than the lower runner 15 and accordingly of lower specific speed than the lower runner. The unit shown is adapted to develop 9500 horsepower at 200 R. P. M. and a head of 40 feet. The throat of the lower runner is located at 4' 9" below tail water so that the velocity head regained in the draft tube plus a factor to cover local cavitation, plus the static draft head will equal the barometric pressure corresponding to 32.83 feet water column. As thus installed the lower runner 15 will develop about 6000 of the total 9500 horsepower and its specific speed will be about 154. The upper runner 14 at the same actual speed will have a specific speed of about 118 and will develop approximately 3500 horsepower determined by the total draft head acting upon it at the throat, said draft head being computed as above indicated as the sum of the static draft head plus the velocity head regained in the draft tube, plus the factor to cover local cavitation. This total should not exceed 32.83 feet.

One of the principles underlying this invention is thus the relation between the elevation of the turbine runner with respect to tail water, the effective head on the runner and its specific speed. As the design of a runner is progressively modified to increase its specific speed, the velocity head of the water passing through it continuously increases and represents an increasing fraction of the effective head. Assuming that the runner will be equipped with an efficient draft tube capable of regaining a large proportion of the velocity head discharged therefrom, the height at which the runner may be located with respect to tail water becomes more and more limited, requiring it to be placed at continually lower elevations, as the specific speed increases. In addition however to this allowance for velocity head based on the average velocity of the stream passing through the runner, a second factor must also be considered, namely, what I have termed "local cavitation", or local pressure reduction. The static pressure existing within the runner is not constant throughout the entire waterway but varies from the periphery toward the axis of the runner and also varies across each bucket from the face of one vane to the back of the next vane and there is therefore a local reduction of pressure at some points of the runner causing this local pressure to be a considerable amount below the average pressure in the entire waterway. This local pressure reduction may be expressed as the product of a coefficient multiplied by the effective head. This coefficient varies somewhat depending on the peculiarity of the individual runner design, but in general it increases with the specific speed of the runner, and for a runner of any given design characteristics, this coefficient must increase if the specific speed is increased.

A curve may be drawn showing the functional relation between this coefficient and the specific speed. Such a curve will represent the general effect of specific speed for runners of usual characteristics and show graphically how the coefficient of cavitation increases with an increase in specific speed. In designing any turbine installation, the specific speed selected for the runner must be such that at a given elevation of the runner with respect to tail water, the sum of the static elevation of the runner above tail water plus the amount of velocity head regained in the draft tube, plus the product of the cavitation coefficient—$k_c$—multiplied by the effective head must not exceed the barometric pressure head; that is, substantially the pressure head of the atmosphere.

It follows that if a runner of a given specific speed is placed too high above tailwater so that the absolute pressure at a local point within the turbine approaches too close to the vapor pressure of water, the water may part from the vane surfaces leaving a cavity filled with vapor, and at such points pitting or corrosion of the metal is likely to occur as well as vibration and a possible impairment of the power and efficiency.

If $h_s$ is the elevation of the runner throat or point of minimum diameter of the turbine passage above tail water; $h_b$ the barometric head corresponding to the temperature of the water and altitude of the location (corresponding to atmospheric pressure minus vapor pressure of the water);

H, the effective head on the turbine; and $N_s$, the specific speed of the runner,
then an approximate empirical relation may be found such that the absolute pressure at any local point within the turbine will not fall below the vapor pressure of the water for turbines of normal characteristics for various specific speeds.

From the available data representing the experience in existing plants, the effects of regained velocity head in the draft tube and the local pressure reduction within the turbine may be combined and expressed as a function of the specific speed. By this method, it is found that in order to provide a proper safeguard against cavitation a specific speed should be selected in relation to elevation above tailwater and effective head in accordance with a formula of the following general form:

For turbines of the Francis type—

$$N_s = 125 \sqrt{\frac{h_b - h_s}{H}}$$

For turbines of the propeller type —

$$N_s = 150 \sqrt{\frac{h_b - h_s}{H}}$$

The coefficients of 125 and 150 are of course dependent upon the particular design characteristics, but the above round figures are sufficient for runners of usual design to provide a general guide in making preliminary calculations. In actual turbine design, the separate effects of cavitation and velocity head regain may be definitely calculated for the particular design and any necessary correction then made in the specific speed or elevation of runner above tailwater.

In a multi-runner vertical shaft turbine where the separate runners must be placed at different elevations, the above formulas will serve as a basis for calculating the power capacity which can be safely assigned to each individual runner using in the case of each runner its own individual elevation $h_s$ above tailwater. Since however the runners are all keyed to the same shaft and must therefore have the same absolute speed of rotation, the horsepower capacities will vary according to the following relation:

For Francis turbines—

$$HP = 15,600 \frac{H^{3/2}}{N^2} (h_b - h_s)$$

For propeller type turbines—

$$HP = 22,500 \frac{H^{3/2}}{N^2} (h_b - h_s)$$

in which N equals the revolutions per minute of the shaft.

The functional relations represented by these formulas are shown on Fig. 8 in which the horsepower capacities of individual runners are plotted for a standard speed of 100 R. P. M. and for heads of 20, 40 and 60 feet in relation to the elevation of the individual runner with respect to tailwater. The horsepower for any other speed can be found by multiplying the horsepower at 100 R. P. M., denoted by $$(HP\ 100N),\ \text{by}\ \left(\frac{100}{N}\right)^2,$$

N being the revolutions per minute.

It will be noted that the relation between the horsepowers of individual runners at constant speed and the runner elevations is a linear one, that is, if we taken an elevation at a height above tailwater equal to the barometric head, which at ordinary temperatures and altitudes may be taken as approximately 32 feet, then the horsepowers of a series of runners at different elevations keyed to the same shaft will be very nearly proportional to their vertical distance below this 32 foot elevation when the runners are of the same general type. Therefore, all of the graphs plotted on this chart are straight lines radiating from a point at 32 feet elevation on the vertical axis of the chart. It will also be noted that a different slope of line must be used for turbines of Francis type from that required by the propeller type.

Therefore, the conditions in some cases will call for the lower runner of a multi-runner vertical shaft turbine to be of a different type from the upper runner. For example, in a turbine for 60 feet head if the upper runner must be placed higher than about five feet above tailwater, the conditions for this upper runner would not be suitable for a propeller runner of usual characteristics according to present practice, and a Francis type runner would then be selected for the upper runner of such a unit. In a unit for such conditions, the lower runner, set at a lower elevation, could be of the propeller type and could therefore have a very much greater capacity than the upper runner.

If in the above formulas, the quantity $h_b-h_s$ is called the absolute static draft head, then it follows that the power capacities of a series of runners mounted on a common shaft should be approximately proportional to their individual absolute static draft heads when the runners are of similar type.

By thus combining with the lower runner the upper runner of less power and of lower specific speed, the power output is greatly increased and the same actual speed of rotation is maintained. In the example given (Figs. 1 and 2) the power is increased by over one-half to attain a total output of 9500 H.P. To attain this same horsepower in a single runner at the same head and same actual speed, the specific speed of the unit would would be 193.5 and the runner should be placed about seventeen feet below tailwater in order to keep the total draft head of the unit equal to or less than 32.83. With this high specific speed a runner would be used that would develop a maximum efficiency considerably lower than the total efficiency of the combined unit of Figs. 1 and 2. The single runner unit, due to the high negative static draft head, would also require a much deeper excavation than the double unit. On the other hand, if the same specific speed were used for the single runner unit as in the lower runner of the unit shown, the actual speed would be materially reduced, the efficiency somewhat lower, and the size of the runner and of the whole unit considerably greater.

The new results of my invention are attained in the turbine of Figs. 1 and 2 simply by interposing the upper or auxiliary runner 14 on the shaft 21 between the lower runner 15 and the generator 22, and providing this runner with the supply and discharge passages for the flow through it. This involves simply a lengthening of the entrance guide vanes and the provision of the flow passage and discharge outlet passage for the upper runner. A continuous columnar support is provided from the sub-foundation to the generator floor by the stay vane rings 20, 16 and 19, and the shaft unit as a whole is made vertically removable and replaceable by forming the outer wall of the upper draft tube as a removable liner 29, setting in a cylindrical space of sufficient diameter to clear the larger periphery of the lower runner 15 as it is withdrawn upward. Thus the entire unit may be dismantled from above.

Due to the large overhang of the shaft 21 beyond the upper guide bearing 23 in removable draft tube cone 24, a lower guide bearing 25 is added in the lower draft tube cone 26, these bearings being supplied with lubricant through pipe connections 27 and 28.

The single ring of guide vanes 17 serving for both runners is operated by submerged operating mechanism comprising ring 40 and links 31 between the ring and vanes, the ring being connected by reach rods 18 and rocker arm 43 to be turned by the vertical shaft 42 from power means controlled by the governor on the power house floor above.

If a single runner were employed under the same conditions as the double runner, there would be required a considerably larger throat diameter than either of the runners in the two-runner unit. Due to the high specific speed, the efficiency of this single unit would probably be 4% or 5% lower than the combined efficiency of the two runners. Or, if the same efficiency should be required, the speed would have to be materially reduced and the runner and other parts be made much larger than either of the two runners shown.

To accomplish this difference in specific speed between the upper and lower runners and also to obtain further advantages one or both of the runners, but preferably the upper runner, can be of the adjustable blade type such as shown in either of my copending applications, Serial Nos. 553,294 and 631,985, filed respectively April 15, 1922 and April 14, 1923. The invention is thus not limited to any particular type of runner. Since the actual speed of all runners must be the same to permit their being keyed to the same shaft, the lower specific speed of the upper runner necessarily requires that it shall have lower horsepower capacity and quantity of discharge than the lower one. The resulting combination produces a unit which is higher in the effective speed of the unit than can be produced either by a single runner or by a multi-runner unit having runners of identical size and design.

This application is a division of application filed May 28, 1927, now patent No. 1,776,391, issued September 23, 1930 and is directed particularly to the modification shown herein wherein the water flows to one runner in one direction and to the other runner in a direction away from the first direction, although it will of course be understood that there are other features of the invention as covered by the appended claims.

It will of course be understood by those skilled in the art that from the foregoing description and illustrations of various modifications that various changes may be made without departing from the spirit of the invention as set forth in the appended claims.

I claim:

1. In a hydraulic turbine the combination with a single shaft, of a plurality of runners thereon at different elevations, the upper one of said runners being of smaller diameter than the lower runner, said runners having different specific speeds and being adapted for the same actual speed during simultaneous normal operation, and means for simultaneously variably controlling the flow to both of said runners.

2. In a hydraulic turbine a central intake passage, a divided discharge passage, a plurality of runners of different specific speeds and power output and adapted for the same actual speed during simultaneous normal operation, the upper one of said runners being of smaller diameter than the lower runner, a common transition space for said runners and a single set of guide vanes for directing the flow to said runners.

3. In a hydraulic turbine a central intake passage, a divided discharge passage, a plurality of runners having the same actual speed while being simultaneously normally operative but of different specific speeds and power output, said runners being spaced from each other on a vertical shaft and the upper runner being of smaller diameter than the lower runner, a common transition space for said runners and a single set of guide vanes for directing the flow to said runners.

4. In a hydraulic turbine an intake passage, a discharge passage, a vertical shaft, a runner on said shaft located below tailwater, a second runner on said shaft located above tailwater of smaller specific speed and power output than the first mentioned runner whereby the upper runner is smaller in diameter than the lower runner, said runners being adapted for the same actual speed during simultaneous normal operation and being spaced apart from each other by a conical distance piece which is adapted to divide the inflow and direct it to both of said runners.

5. In a hydraulic turbine a central intake passage, a vertical shaft, a runner on the lower end of said shaft receiving the flow downwardly from said intake, a second runner of different specific speed and power output spaced on said shaft above said first mentioned runner and receiving the flow upwardly from said intake, said runner on the lower end of said shaft being of larger diameter than said second runner and both of said runners being adapted for the same actual speed during simultaneous normal operation, a common transition space between said runners and a discharge passage receiving the flow from both of said runners.

6. In a hydraulic turbine, the combination comprising an intake passage, a discharge passage, a vertical shaft, a runner on said shaft located below tailwater, a second runner on said shaft located above tailwater and being of lower specific speed and power output than the first mentioned runner, said second runner being of smaller diameter than said other runner and both of said runners being adapted for the same actual speed during simultaneous normal operation and being spaced from each other by a curved distance piece forming an inner boundary of a transition space adapted to divide the inflow and direct it to both of said runners.

7. In a hydraulic turbine, the combination comprising a single vertically disposed shaft, a plurality of runners thereon at different elevations and having different specific speeds adapted for the same actual speed during simultaneous normal operation, the upper one of said runners being of smaller diameter than the lower runner, and means whereby fluid flows to one runner in one direction and to the other runner in a direction away from the first direction.

8. In a hydraulic turbine, the combination comprising a single vertically disposed shaft, a plurality of runners thereon at different elevations and having different specific speeds adapted to permit simultaneous normal operation, at the same actual speed, and said uppermost runner being of smaller diameter than a lower runner, and means whereby the degree of whirl in the flow to each runner may be varied.

9. In a hydraulic turbine, the combination comprising a single shaft, a plurality of runners thereon at different elevations and having different specific speeds adapted for simultaneous normal operation at the same actual speed, whereby an upper one of said runners is of smaller diameter than a lower runner, means whereby whirl may be imparted to the flow to each runner, and means whereby the degree of whirl to each runner may be simultaneously adjusted.

10. In a hydraulic turbine, the combination comprising a single vertically disposed shaft, a plurality of runners thereon at different elevations and having different specific speeds adapted for simultaneous normal operation at the same actual speed whereby an upper one of said runners is of smaller diameter than a lower runner, means forming a common transition space between said runners, and an entrance passage communicating with said transition space and lying within substantially the same plane as said space.

11. A hydraulic turbine comprising, in combination, a single vertically disposed shaft, a plurality of runners disposed thereon at different elevations and having different specific speeds adapted to have simultaneous normal operation at the same actual speed whereby an upper one of said runners is of smaller diameter than a lower runner, means forming a common transition space between said runners, and a volute inlet passage communicating with said transition space around its entire circumference whereby the fluid flows from said volute passage to said space in a radially inward direction and then divides and flows in opposite directions to said runners.

12. A hydraulic turbine comprising, in combination, a single vertically disposed shaft, a plurality of runners disposed thereon at different elevations and having different specific speeds adapted to permit simultaneous normal operation at the same actual speed whereby an upper one of said runners is of smaller diameter than a lower runner, means forming a common transition space between said runners, a volute inlet passage communicating with said transition space around its entire circumference whereby the fluid flows from said volute passage to said space in a radially inward direction and then divides and flows in opposite directions to said runners, and means adapted to impart whirl to the flow which passes into said transition space.

13. A hydraulic turbine comprising, in combination, a single vertically disposed shaft, a plurality of runners thereon of different specific speeds and adapted for simultaneous normal operation at the same actual speed whereby an upper one of said runners is of smaller diameter than a lower runner, means forming a common transition space between said runners, separate flow decelerating draft tubes for each runner, and means forming connecting passages leading from said draft tubes into a common tailrace passage with the inner walls of said connecting passages defining a tapered formation.

14. A hydraulic turbine comprising, in combination, a single vertically disposed shaft, a plurality of runners thereon of different specific speeds and adapted for the same actual speed during simultaneous normal operation whereby an upper one of said runners is of smaller diameter than a lower runner, means forming a common transition space between said runners, separate flow decelerating draft tubes for each runner, and means forming connecting passages leading from said draft tubes into a common tailrace passage with the inner walls of said connecting passages defining a tapered formation in a downstream direction when viewed in vertical section.

15. A hydraulic turbine comprising, in combination, a single vertically disposed shaft, a plurality of runners thereon having different specific speeds and adapted to have simultaneous normal operation at the same actual speed whereby an upper one of said runners is of smaller diameter than a lower runner, means forming a common transition space between said runners, a separate flow decelerating draft tube for each runner, collector passages surrounding said draft tubes and discharging in a downstream direction, and means forming passages for connecting the collector passages with a common tailrace passage, the upstream walls of said connecting passage defining a tapered formation in a downstream direction when viewed in vertical section.

16. A hydraulic turbine comprising, in combination, a single vertically disposed shaft, a plurality of runners thereon having different specific speeds adapted for the same actual speed during simultaneous normal operation whereby an upper one of said runners is of smaller diameter than a lower runner, means forming a common transition space between said runners, separate flow decelerating draft tubes for each runner of substantially similar form, collector passages surrounding said draft tubes and extending downstream and means forming a passage for connecting the collector passage with a common tailrace passage, the upstream walls of said connecting passage defining a tapered formation in a downstream direction when viewed in vertical section.

17. A hydraulic turbine comprising, in combination, a single vertically disposed shaft, a plurality of runners thereon of different specific speeds and adapted for the same actual speed during simultaneous normal operation whereby an upper one of said runners is of smaller diameter than a lower runner, means forming a common transition space between said runners, and draft tubes, one leading from each runner in opposite directions, each draft tube having smoothly curving inner and outer walls formed as surfaces of revolution.

18. A hydraulic turbine comprising, in combination, a single vertically disposed shaft, a plurality of runners thereon of different specific speed and adapted for the same actual speed during simultaneous normal operation whereby an upper one of said runners is of smaller diameter than a lower runner, means forming a common transition space between said runners, and draft tubes, one leading from each runner in opposite directions, the inner wall of said transition space being in the form of a smoothly curving double ended conical member whose surface merges with the hubs of said runners.

LEWIS FERRY MOODY.